United States Patent
Smith (10) Patent No.: US 8,950,670 B1
(45) Date of Patent: Feb. 10, 2015

(54) BARCODE TO MAGNETIC MEDIA CONVERTER

(71) Applicant: Cubic Corporation, San Diego, CA (US)

(72) Inventor: Gavin R. Smith, Crawley (GB)

(73) Assignee: Cubic Corporation, San Diego, CA (US)

( * ) Notice: Subject to any disclaimer, the term of this patent is extended or adjusted under 35 U.S.C. 154(b) by 0 days.

(21) Appl. No.: 14/331,606

(22) Filed: Jul. 15, 2014

Related U.S. Application Data (60) Provisional application No. 61/846,949, filed on Jul. 16, 2013.

(51) Int. Cl.
*G07B 15/02* (2011.01)
*G06K 5/02* (2006.01)

(52) U.S. Cl.
CPC ........................................ *G06K 5/02* (2013.01)
USPC ............................ 235/384; 235/375; 235/493

(58) Field of Classification Search
CPC . G06K 17/00; G06K 19/06187; G06K 19/12; G06K 1/125; G07B 15/02; G07B 15/00; G07F 7/00; G07C 9/00103
USPC ................................ 235/375, 384, 382, 493
See application file for complete search history.

(56) References Cited

U.S. PATENT DOCUMENTS

| | | | | |
|---|---|---|---|---|
| 3,501,622 A * | 3/1970 | Szymanski et al. | ........... | 235/384 |
| 3,641,931 A * | 2/1972 | Hickox et al. | ................. | 101/93 |
| 4,977,502 A * | 12/1990 | Baker et al. | ...................... | 705/13 |
| 4,977,994 A * | 12/1990 | Adachi et al. | .................. | 194/210 |
| 5,191,195 A * | 3/1993 | Aubrey | ......................... | 235/384 |
| 5,298,726 A * | 3/1994 | Aubrey | ......................... | 235/384 |
| 5,409,092 A * | 4/1995 | Itako et al. | ..................... | 194/210 |
| 5,450,051 A * | 9/1995 | Stromberg | ..................... | 235/384 |
| 5,498,860 A * | 3/1996 | Ohno et al. | ..................... | 235/384 |
| 5,514,857 A * | 5/1996 | Corless | ......................... | 235/384 |
| 5,550,360 A * | 8/1996 | Muraoka | ....................... | 235/384 |
| 5,969,332 A * | 10/1999 | Ueda et al. | .................... | 235/492 |
| 6,595,416 B1 * | 7/2003 | Newsome et al. | ............ | 235/381 |
| 7,213,755 B2 * | 5/2007 | Newsome et al. | ............ | 235/384 |
| 7,654,452 B2 * | 2/2010 | Gravelle | ....................... | 235/383 |
| 8,523,061 B2 * | 9/2013 | Roux | ............................ | 235/380 |
| 2004/0016801 A1 * | 1/2004 | Newsome et al. | ............ | 235/382 |
| 2009/0283591 A1 * | 11/2009 | Silbernagl | ..................... | 235/382 |
| 2012/0234914 A1 * | 9/2012 | Roux | ............................ | 235/380 |
| 2012/0255994 A1 * | 10/2012 | Silbernagl | ..................... | 235/379 |

\* cited by examiner

*Primary Examiner* — Paultep Savusdiphol
(74) *Attorney, Agent, or Firm* — Kilpatrick Townsend & Stockton LLP (57) ABSTRACT

Embodiments of the invention provide systems and methods for converting barcode media to magnetic media. In one aspect, a method for converting a barcode media into a magnetic stripe media is provided. The method includes reading data encoded on a barcode media. The data includes information indicative of a transit purchase and an identifier of the barcode media. The barcode media is authenticated by checking the identifier against a list of issued barcodes and determining that the barcode media is unused by checking the identifier against a list of used barcode media. The method includes converting the data from the barcode media into magnetic data storable on a magnetic media and writing the magnetic data onto the magnetic media. The method includes distributing the magnetic media containing the magnetic data and communicating information related to a conversion transaction. The information includes an indication of the distribution of the magnetic media.

20 Claims, 4 Drawing Sheets

BARCODE TO MAGNETIC MEDIA CONVERTER

CROSS-REFERENCES TO RELATED APPLICATIONS

This nonprovisional application claims priority from U.S. Provisional Application No. 61/846,949, filed on Jul. 16, 2013, the complete disclosure of which is hereby incorporated by reference.

BACKGROUND OF THE INVENTION

Two-dimensional (2D) barcodes are a highly cost effective and efficient method for delivering a transit ticket to a passenger. The barcodes may be printed at home on the passenger's own printer and paper, can be delivered to the passenger's mobile phone, or can be printed on receipt paper at a vending machine. However, in heavily gated environments like the UK national rail network, magnetic ticket reading is often integrated into the gateline infrastructure while barcode reading is not. The cost of upgrading every gate to accept barcodes is prohibitive and undermines the benefits associated with the reduced cost of sale of the barcode. Embodiments of the invention may provide solutions to these and other problems.

BRIEF SUMMARY OF THE INVENTION

Techniques are disclosed herein for converting a barcode embodying a transport ticket (which is cheap and easy to deliver) into a magnetic stripe ticket or other magnetic media which may be validated by transit gatelines. Embodiments may allow for barcodes provided in any form, such as on paper, cardstock, or a digital representation of a barcode on a mobile device, to be converted into magnetic media. Embodiments may also keep records of each conversion conducted to prevent a barcode media from being used and/or converted more than once.

In one embodiment, a method for converting a barcode media into a magnetic stripe media is provided. The method may include reading data encoded on a barcode media using a barcode reader. The data may include information indicative of a transit purchase and an identifier of the barcode media. The method may also include authenticating the barcode media by checking the identifier of the barcode media against a list of issued barcodes and determining that the barcode media is unused by checking the identifier of the barcode media against a list of used or unused barcode media. The method may further include converting the data from the barcode media into magnetic data storable on a magnetic media and writing the magnetic data onto the magnetic media. The method may also include distributing the magnetic media containing the magnetic data and communicating information related to a conversion transaction. The information related to a conversion transaction may include an indication of the distribution of the magnetic media.

In another embodiment, a non-transitory computer-readable medium having instructions embedded thereon for converting a barcode media into a magnetic stripe media is provided. The instructions may include computer code for causing a computing device to read data encoded on a barcode media. The data may include information indicative of a transit purchase and an identifier of the barcode media. The instructions may also include computer code for causing a computing device to authenticate the barcode media by checking the identifier of the barcode media against a list of issued barcodes and determine that the barcode media is unused by checking the identifier of the barcode media against a list of used or unused barcode media. The instructions may further include computer code for causing a computing device to convert the data from the barcode media into magnetic data storable on a magnetic media and write the magnetic data onto the magnetic media. The instructions may also include computer code for causing a computing device to distribute the magnetic media containing the magnetic data and communicate information related to a conversion transaction. The information related to a conversion transaction may include an indication of the distribution of the magnetic media.

In another embodiment, a system for converting a barcode media into a magnetic stripe media is provided. The system may include a barcode reader configured to read data encoded on a barcode media. The data may include information indicative of a transit purchase and an identifier of the barcode media. The system may also include a writing module configured to write magnetic data to a magnetic media and a distribution module configured to distribute the magnetic media. The system may further include a processor configured to authenticate the barcode media by checking the identifier of the barcode media against a list of issued barcodes and determine that the barcode media is unused by checking the identifier of the barcode media against a list of used or unused barcode media. The processor may also be configured to convert the data from the barcode media into magnetic data storable on a magnetic media and cause the writing module to write the magnetic data onto the magnetic media. The processor may be further configured to cause the distribution module to distribute the magnetic media and communicate information related to a conversion transaction. The information related to a conversion transaction may include an indication of the distribution of the magnetic media.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

For the purposes of explanation, the ensuing description provides specific details are set forth in order to provide a thorough understanding of various embodiments. It will be apparent, however, to one skilled in the art that various embodiments may be practiced without some of these specific details. For example, circuits, systems, networks, processes, and other components may be shown as components in block diagram form in order not to obscure the embodiments in unnecessary detail. In other instances, known circuits, processes, algorithms, structures, and techniques may be shown without unnecessary detail in order to avoid obscuring the embodiments. In other instances, well-known structures and devices are shown in block diagram form.

Embodiments of the present invention can convert unused barcode media into magnetic media in a single action without human assistance. This is especially useful in transit applications, as many transit gates only include magnetic media readers. The cost to include barcode readers at each transit gate would be excessive, so by placing a converter at each transit station, costs may be kept down while allowing users to continue being issued barcode media. Barcodes offer cheap and easy to issue ticket options. Users may be issued a barcode and/or barcode media at locations remotely located from the transit gate, such as at home or at the workplace. For example, a user may purchase or otherwise be issued a barcode media using a personal computer or mobile device. Issued barcodes may be printed on paper, card stock, or another substrate. Users may bring the issued barcode media to a transit station where it may be converted to a magnetic media. Transit operators would like more passengers to use barcodes for ticketing due to a low cost of delivery. Additionally, by allowing delivery to a person's home computer and/or mobile device, wait times at transit ticket offices may be reduced and costs associated with staffing these offices may be reduced. While discussed primarily in conjunction with transit applications, it will be appreciated that barcode media to magnetic media conversions may be used in any other field where both forms of media may be used.

According to embodiments of the present invention, a barcode to magnetic media converter at each transit station would provide a simple and cost effective way for passengers to convert their barcode media into magnetic media that may be checked by automated gatelines. Once the converters are in place throughout a transit system, cost effective barcode delivery may be promoted as an alternative to purchasing magnetic media online for distribution by a vending machine at a transit location.

In one embodiment, a system for converting a barcode media into a magnetic media is provided. The system may include a barcode reader configured to read data encoded on a barcode media. Barcode media may include any substrate having a barcode printed or otherwise displayed. For example, barcode media may include paper and/or cardstock having a barcode printed thereon. Barcode media may also include digital representations of barcodes on a display, such as a display of a mobile device. Barcode media may be issued by a ticket vending machine, at a ticket booth, on a user's computing device and/or mobile device, and/or using any other method of producing a barcode. In some embodiments, a barcode media may include a linear barcode, matrix barcode, quick response (QR) code, and/or any 2D and/or 3D barcode.

In some embodiments, the data created on the barcode media may include information indicative of a transit purchase and an identifier of the barcode media. Information indicative of a transit purchase may include a time of the transit purchase, a date of the transit purchase, the location of the transit purchase, a dollar amount of the transit purchase, a product and/or service included in the transit purchase, an expiration date of a product and/or service included in the transit purchase, and/or any other information related to a transit purchase. This information may be stored on and/or otherwise associated with the barcode on the barcode media.

For example, a barcode management system may issue a barcode upon a purchase of a transit product and/or service. In some embodiments, the purchased transit product and/or service may be associated with the barcode in a list and/or database stored on the barcode management system. In some embodiments, the identifier of the barcode media represents a serial number, code, or other tag associated with the information indicative of a transit purchase. The identifier may be used to look up the barcode media and any information associated therewith on the list and/or database. In other embodiments, such as those using 2D and/or 3D barcodes, the information may be stored directly on the barcode media and/or on a list.

The system may also include a writing module configured to write magnetic data to a magnetic media. The writing module may include any device that may write, encode, or otherwise cause data to be stored on a magnetic media. Magnetic media include paper, cardstock, plastic, and cards of other materials that include magnetic material capable of storing data. In some embodiments, the magnetic material is configured in a band or stripe that allows the media to be swiped in a reader that may access the data stored on the media.

A distribution module may be configured to distribute the magnetic media. The distribution module may include any device or mechanism that allows a magnetic media containing magnetic data to be dispensed to a user. In some embodiments, the distribution module interfaces with the writing module such that distribution provides a blank magnetic media from a stock of magnetic media to the writing module. After the writing module encodes magnetic data on the magnetic media, the distribution module may dispense the encoded magnetic media.

The system may further include a processor configured to authenticate the barcode media by checking the identifier of the barcode media against a list of issued barcodes. The list of issued barcodes may be stored locally on a memory of a converter system, on a local system or server of a transit location, and/or on a remote system or server of the transit system. A remote system may be a central server that is communicatively connected to each converter system, transit station, transit gate, and/or fare inspection scanner.

The processor may be configured to determine that the barcode media is unused by checking the identifier of the barcode media against a list of used or unused barcode media. In some embodiments, the list may be a black list includes only those barcodes that have already been used and/or converted. In other embodiments, the list may be a white list that includes only those barcodes and barcode media that are unused. Using such as whitelist may become more practical as the system is used longer, as the list of unused barcodes will likely be much smaller than the ever growing list of used barcodes. Using the white lists may require less space for storing the list data. In some embodiments, the list may include both used and unused barcodes and barcode media, while in other embodiments, two separate lists for used and unused barcodes may be maintained and checked against. The list and/or lists may be stored locally on the system, on a system or server local to a transit location, and/or remotely on a central system or server of a transit system.

The processor may also be configured to convert the data from the barcode media into magnetic data storable on a magnetic media. The data read from the barcode may be stored in a memory of the system. This stored data may then be converted into magnetic data. The processor may be configured to then cause the writing module to write the magnetic data onto the magnetic media. The processor may be further configured to cause the distribution module to distribute the magnetic media.

The processor may be configured to communicate information related to a conversion transaction. The information related to a conversion transaction may include an indication of the distribution of the magnetic media. In some embodiments, the information related to a conversion transaction may include an indication that the barcode media has been converted to a magnetic media.

Figure 1:
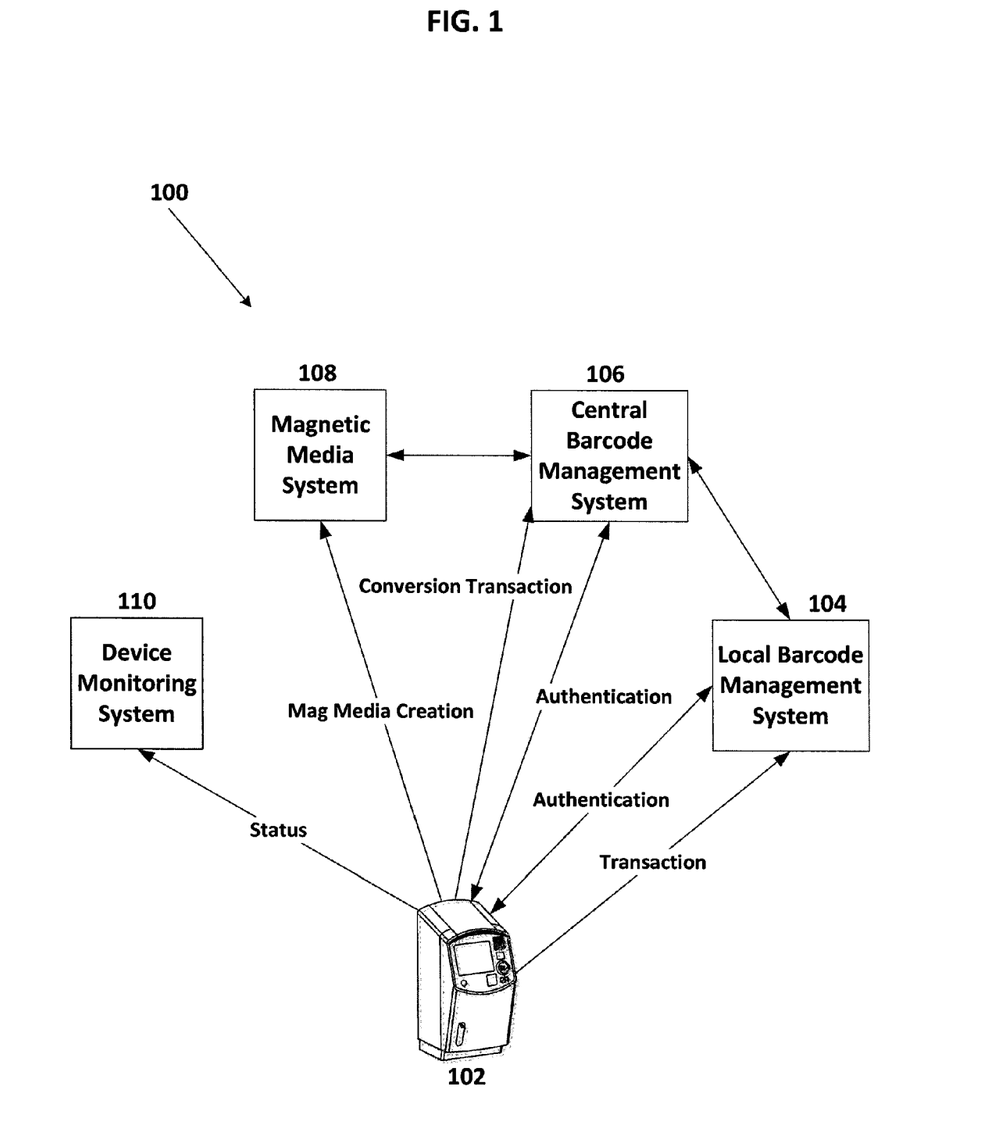
FIG. 1 is a system diagram of a system for converting barcode media to magnetic media, according to embodiments of the invention.

FIG. 1 depicts a system 100 of converting barcode media to magnetic media. System 100 may include a converter 102 that may be located at a transit station or any other convenient location. Converter 102 may be communicatively coupled with a local barcode management system 104 and/or a central barcode management system 106. Local barcode management system 104 may be located locally at a transit station, such as a transit station where the converter 102 is positioned. Central barcode management system 106 may be located remotely from a transit station, and may be in communication with all local barcode management systems 104 within system 100, as well as each converter 102 in the system 100.

Each issued barcode is encrypted with a unique serial number and/or other identifier. In some embodiments, the barcode is generated by the central barcode management system 106, which then stores a record of the barcode, such as in a list and/or database of issued barcodes. In some embodiments, the central barcode management system 106 prevents a user from printing or otherwise receiving the same barcode twice. If a user loses the barcode, the central barcode management system 106 may securely issue a new barcode having a new serial number and/or identifier associated with the record. The central barcode management system 106 may deactivate the first barcode, such as by tagging the serial number or other identifier as used in a list and/or database.

The record of an issued barcode may include a time and/or date of the barcode creation transaction, a product and/or service associated with the transaction, an internet protocol (IP) address associated with the transaction, and/or any other information related to the transaction. The record may be associated with the number and/or other identifier of the barcode. For example, central barcode management system 106 may maintain a list and/or database of issued barcodes. Each device (converter 102, transit gate, fare inspection scanner, etc.) within system 100 may query the local barcode management system 104 and/or central barcode management system 106 to determine whether the barcode has been used. In some embodiments, the devices query the local barcode management system 104, as it may be continuously updated by the central barcode management system 106. Due to the proximity of the local barcode management system 104 to the devices, minimal time is needed to poll a list or database containing this record.

The converter 102 may pass transaction information to the local barcode management system 104. The transaction information may include the serial number and/or other identifier of a barcode on a barcode media. Local barcode management system 104 may then check the serial number against a list of issued barcodes to determine whether the barcode is authentic. The transaction information may also include a date of the conversion transaction, a time of the conversion transaction, a location of the conversion transaction, and/or any other information related to the conversion transaction The local barcode management system 104 and/or the central barcode management system 106 may also be in communication with transit gates and/or fare inspection scanners. The interconnection between the converter 102, barcode management systems 104 and 106, transit gates, and/or fare inspection scanners enables system 100 to monitor the usage of issued barcodes such that no barcode is used more than once. An indication that a barcode was scanned for access to a transit system, either at a transit gate or by a fare inspector, or was converted by a converter 102 may be transmitted to the local barcode management system 104 and/or central barcode management system 106. The local barcode management system 104 and/or central barcode management system 106 may then change a status of the barcode to "used," preventing the barcode from being used or converted again. In some embodiments, the "used" indication may be sent to the local barcode management system 104, which then communicates this indication to the central barcode management system 106 such that the status of the barcode may be propagated to all local barcode management systems 104 within a transit system. In other embodiments, the indication is sent directly from the gate or fare inspection scanner to the central barcode management system 106 for propagation to all local barcode management systems 104.

The local barcode management system 104 and/or central barcode management system 106 may maintain one or more lists related to the status of the barcodes. For example, a white list may include a list of all unused barcodes, while a black list may include a list of all used barcodes. Blacklists may grow excessively large as time goes on, and oftentimes only a white list will be stored on the local barcode management system 104 and/or central barcode management system 106. However, some embodiments may use black lists alone or with white lists. The white list and/or black list may also include the record included on the list of issued barcodes. In some embodiments, the list of issued barcodes may be integrated with the list of used and/or the list of unused barcodes. The lists and/or databases stored in the local barcode management system 104 and/or central barcode management system 106 may be updated in real-time, or may be transmitted to stations and devices associated with the system 100 at specified intervals, such as every five minutes. A real-time update, or an update having a very short delay, on the order of milliseconds, may be useful in preventing multiple uses and/or conversions of the same barcode media.

In some embodiments, records and/or indications of the issuance, usage, and/or conversion of a barcode are updated initially on the central barcode management system 106. The updated records and/or indications may be transmitted to any local barcode management systems 104 within system 100. The updated records and/or indications at the local barcode management system level enable devices such as converter 102, transit gates, fare inspection scanners, and the like to quickly access the records, indications, lists, and/or databases, such that a determination of whether a barcode is valid and/or unused may be made very quickly.

The update frequency for the records, indications, lists, and/or databases at the local level may depend on a fare type. For example, a station-to-station media only works at a departure station, thus there is not as big of a rush to update the information, as there is no danger the barcode would be used at another location. However, zonal or system-wide media would necessitate that the information is updated very quickly, as a user may provide the media at any station within the zone and/or system specified on the media. For zonal and/or station-wide tickets any use and/or conversion must be updated zone-wide and/or system-wide to prevent double use of the media.

After the barcode is authenticated and determined to be unused, the converter 102 converts the data stored on and/or associated with the barcode to magnetic data that is storable on a magnetic media. The converter 102 and/or local barcode management system 104 may then communicate an indication that the barcode has been used and/or converted to the central barcode management system 106. By marking the barcode as used and activating the magnetic media, the system 100 ensures that only one ticket media remains active and usable for transit access. In some embodiments, the use indication may not be sent until after the magnetic media has been issued to prevent the barcode from being deactivated in situations where a magnetic media is not able to be issued. The converter 102 may have a writing module that encodes or otherwise writes the data to a magnetic material on a media. The magnetic media may then be dispensed or otherwise distributed. System 100 may also include a magnetic media system 108 that is in communication with the converter 102. Converter 102 may then send a transaction including an indication to the magnetic media system 108 that the magnetic media has been created. This transaction does not typically include a payment, as a user is merely exchanging one media for another media having the same products and/or services stored on and/or otherwise associated with it. The magnetic media system 108 may include the ability to verify that the barcode was paid for and may associate a record of the payment with a record of the newly issued magnetic media. This may be done by communicating with the central barcode management system 106.

The system 100 may also include a device monitoring system 110. The device monitoring system 110 may receive an indication of the status of one or more components of the converter 102. Device monitoring system 110 may also track an inventory of blank magnetic media stored in the converter 102. This monitoring enables converter 102 to be serviced and/or restocked in a timely manner.

Figure 2:
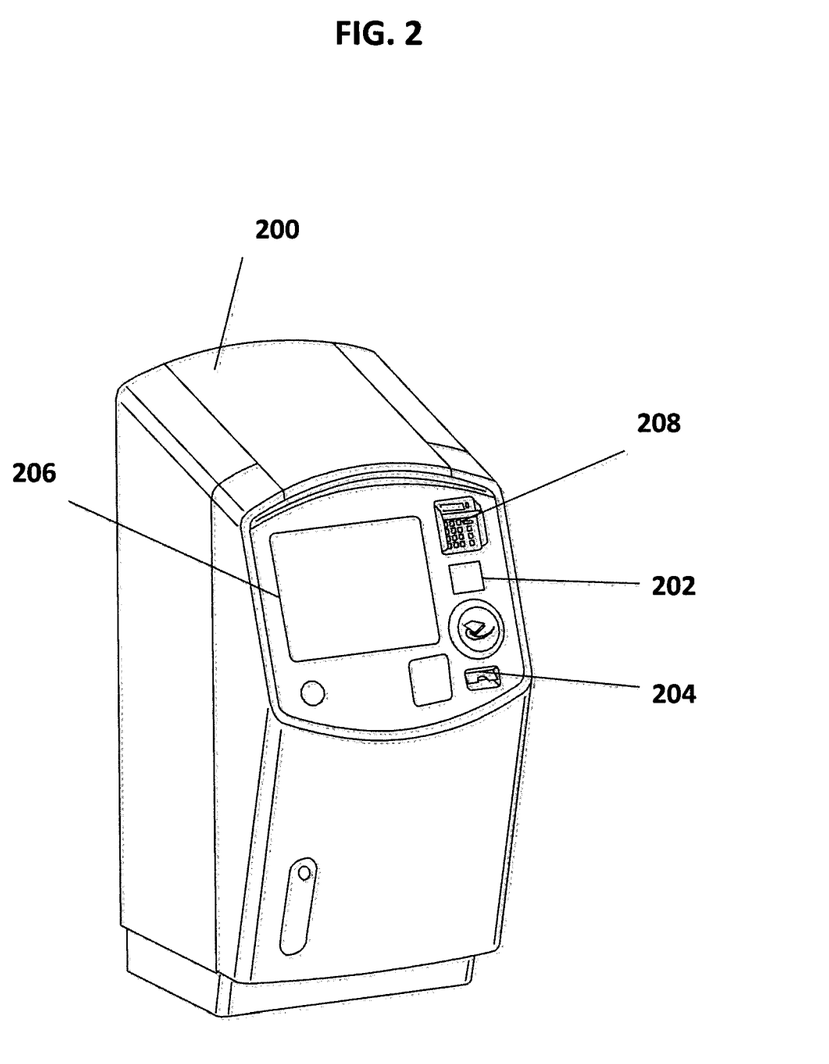
FIG. 2 is a depiction of a barcode media to magnetic media converter, according to one embodiment.

FIG. 2 illustrates one embodiment of a barcode media to magnetic media converter 200. In some embodiments, converter 200 may be the converter 102 described in FIG. 1. Converter 200 may be a small kiosk-like device and may include a barcode reader 202 and a writing module 204. Barcode reader 202 may be configured to read information associated with and/or stored on any type of barcode, such as linear barcodes, matrix barcodes, QR codes, and/or any other 2D and/or 3D barcodes. Writing module 204 may be configured to write, encode, or otherwise store data on a magnetic media. Converter 200 may also include a display or screen 206. Screen 206 may present information that may guide a user through the conversion process and/or provide the user with a status of the converter and/or conversion process. For example, screen 206 may indicate to the user that a problem, such as the machine being out of stock of blank magnetic media, has occurred and a magnetic media may not be issued. The converter 200 may also include an input interface 208, such as a keyboard or touchscreen, which allows a user to interact with the converter 200. A distribution module (not shown) may be included to retrieve a blank magnetic media from a stock of magnetic media and provide the blank magnetic media to the writing module. The distribution module may also transport the encoded magnetic media from the writing module and dispense the media to a user. In some embodiments, the functionality of the distribution module may be integrated with writing module 204.

Figure 3:
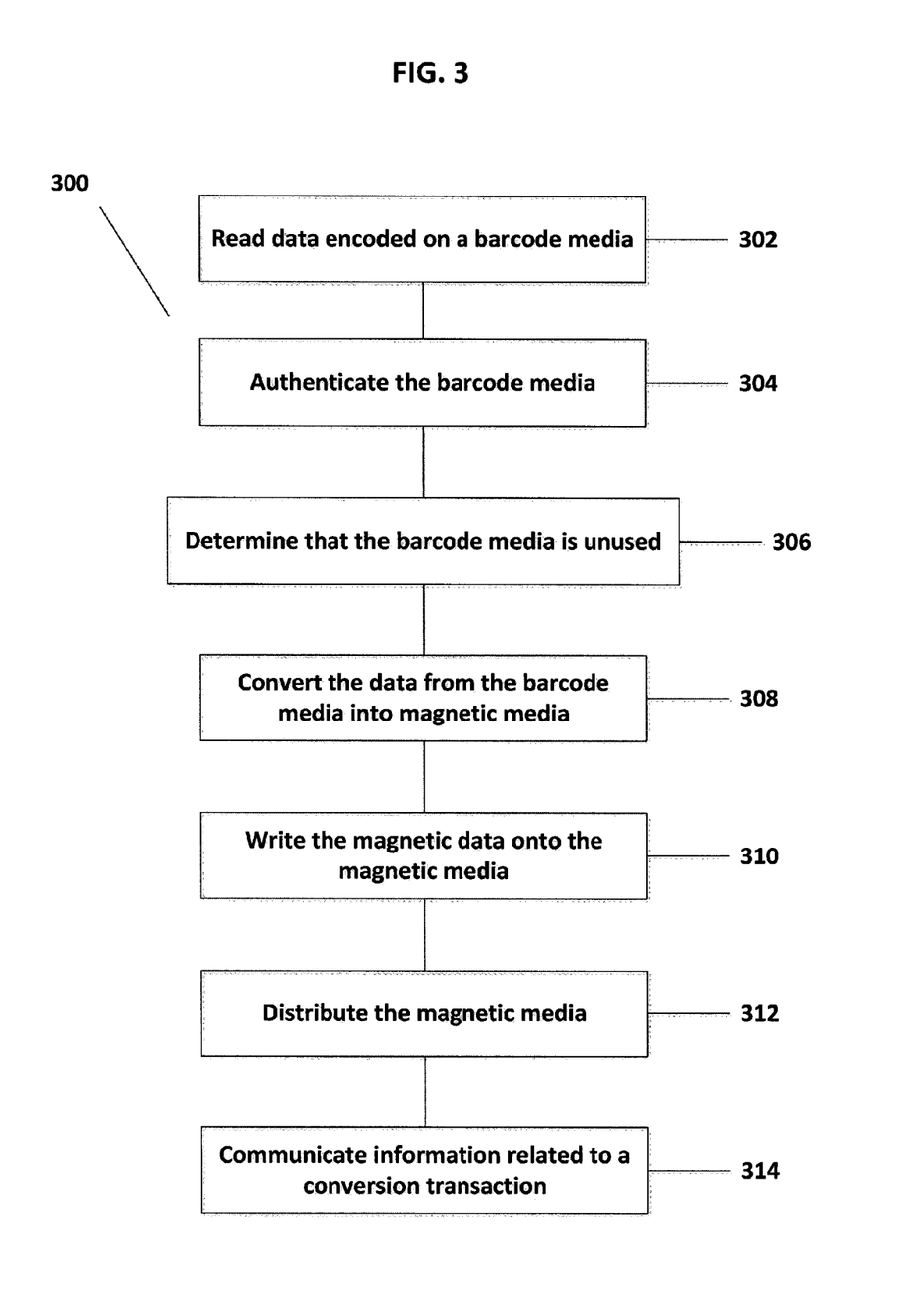
FIG. 3 is a flow diagram illustrating a process of converting barcode media to magnetic media, according to embodiments of the invention.

FIG. 3 illustrates one embodiment of a method 300 for converting a barcode media into a magnetic stripe media. The method 300 may include reading data encoded on a barcode media using a barcode reader at block 302. For example, the barcode media may be read by barcode reader 202 of FIG. 2. The data may include information indicative of a transit purchase and an identifier of the barcode media. In some embodiments, the information indicative of the transit purchase may include a time of the transit purchase, a date of the transit purchase, a location of the transit purchase, and/or any other information related to the transit purchase. Method 300 may also include authenticating the barcode media by checking the identifier of the barcode media against a list of issued barcodes at block 304. Method 300 may further include determining that the barcode media is unused by checking the identifier of the barcode media against a list of used or unused barcode media at block 306. In some embodiments, the list of issued barcodes and/or the list of used or unused barcodes may be stored on a local barcode media system and/or a centrally located remote barcode media system. For example, the lists may be stored on local barcode management system 104 and/or central barcode management system 106 of FIG. 1. The method may also include presenting information related to a conversion of the barcode media on a display of a barcode to magnetic media converter, such as on display 206 of FIG. 1. In some embodiments, a white list including only unused barcodes may be used to cut down on the amount of list storage required.

The data from the barcode media may be converted into magnetic data storable on a magnetic media at block 308. In some embodiments, the method may also include communicating an indication that the barcode media has been used. This indication may be provided after the distribution of a magnetic media to prevent the user from having no usable tickets in situations where a magnetic media is not issuable due to errors. In some embodiments, the indication may be provided to a barcode management system, such as local barcode management system 104 and/or central barcode management system 106 as described in FIG. 1. In some embodiments, At block 310, magnetic data may be written onto the magnetic media. This may be done by a writing module, such as writing module 204 as described in FIG. 2. The method 300 may also include distributing the magnetic media containing the magnetic data, such as by a writing module and/or distribution module at block 312. Information related to a conversion transaction may be communicated at block 314. The information related to a conversion transaction may include an indication of the distribution of the magnetic media. In some embodiments, the method also includes associating funds used as payment for the barcode media with the magnetic media. In some embodiments, the method may also include checking a status of a component of the barcode to magnetic media converter. An available stock of blank magnetic media remaining in the converter may also be determined. The status of the component or components, as well as a number representing the available stock of magnetic media may be transmitted to a device monitoring system such that the converter may be quickly serviced and/or restocked when necessary.

Figure 4:
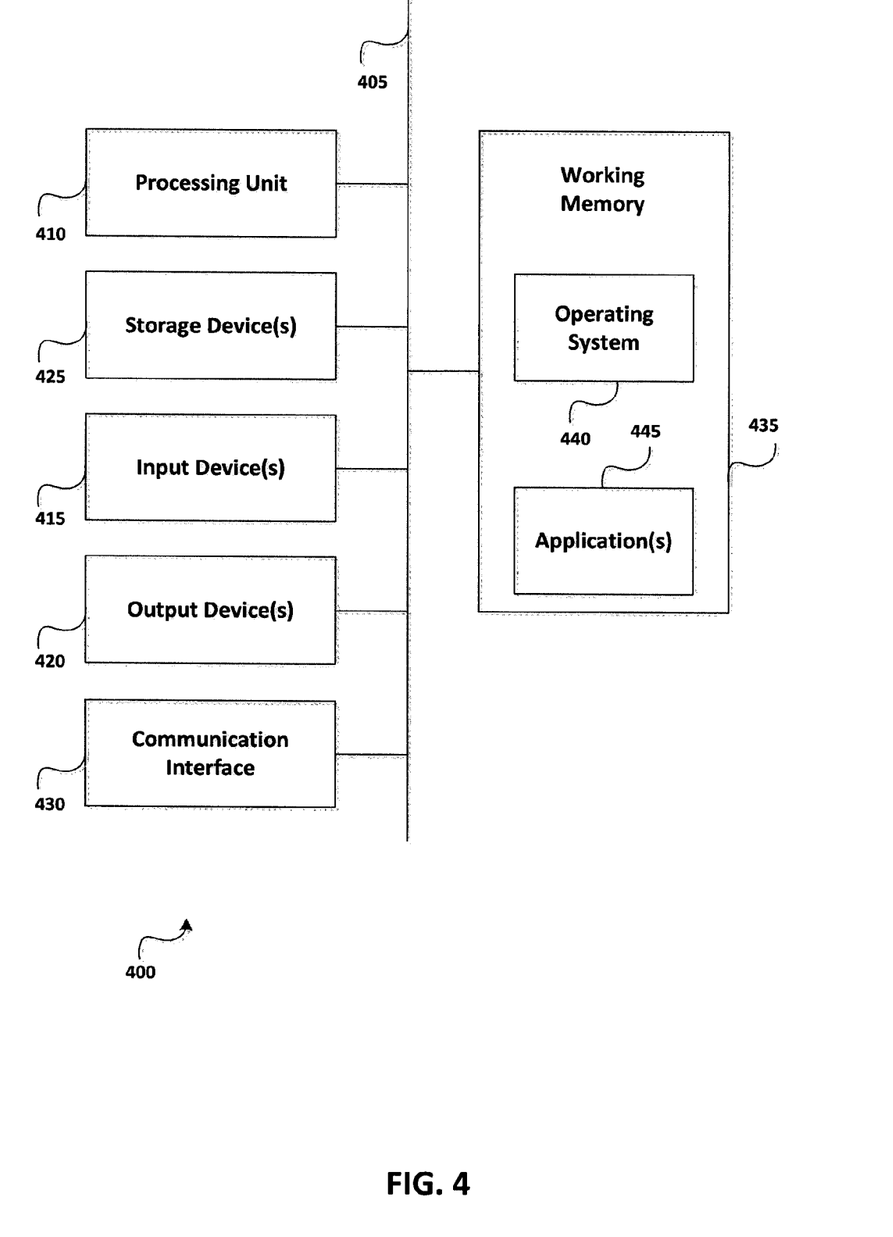
FIG. 4 is a block diagram of an example computing system.

A computer system as illustrated in FIG. 4 may be incorporated as part of the previously described computerized devices. For example, computer system 400 can represent some of the components of the converter 102, local barcode management system 104, central barcode management system 106, magnetic media system 108 and/or device monitoring system 110 of FIG. 1. FIG. 4 provides a schematic illustration of one embodiment of a computer system 400 that can perform the methods provided by various other embodiments, as described herein, and/or can function as the host computer system, a remote kiosk/terminal, a point-of-sale device, a mobile device, and/or a computer system. FIG. 4 is meant only to provide a generalized illustration of various components, any or all of which may be utilized as appropriate. FIG. 4, therefore, broadly illustrates how individual system elements may be implemented in a relatively separated or relatively more integrated manner.

The computer system 400 is shown comprising hardware elements that can be electrically coupled via a bus 405 (or may otherwise be in communication, as appropriate). The hardware elements may include a processing unit 410, including without limitation one or more general-purpose processors and/or one or more special-purpose processors (such as digital signal processing chips, graphics acceleration processors, and/or the like); one or more input devices 415, which can include without limitation a mouse, a keyboard, a touchscreen, a barcode scanner, a motion sensor, a camera, and/or the like; and one or more output devices 420, which can include without limitation a writing module, distribution module, display device, a speaker, a printer, and/or the like.

The computer system 400 may further include (and/or be in communication with) one or more non-transitory storage devices 425, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 400 might also include a communication interface 430, which can include without limitation a modem, a network card (wireless or wired), an infrared communication device, a wireless communication device and/or chipset (such as a Bluetooth™ device, an 502.11 device, a WiFi device, a WiMax device, an NFC device, cellular communication facilities, etc.), and/or similar communication interfaces. The communication interface 430 may permit data to be exchanged with a network (such as the network described below, to name one example), other computer systems, and/or any other devices described herein. In many embodiments, the computer system 400 will further comprise a non-transitory working memory 435, which can include a RAM or ROM device, as described above.

The computer system 400 also can comprise software elements, shown as being currently located within the working memory 435, including an operating system 440, device drivers, executable libraries, and/or other code, such as one or more application programs 445, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 425 described above. In some cases, the storage medium might be incorporated within a computer system, such as computer system 400. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 400 and/or might take the form of source and/or installable code, which, upon compilation and/or installation on the computer system 400 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system (having specialized components) or may be part of a more generic system. For example, an journey planning and pricing engine configured to provide some or all of the features described herein relating to the journey planning and/or pricing can comprise hardware and/or software that is specialized (e.g., an application-specific integrated circuit (ASIC), a software method, etc.) or generic (e.g., processing unit 410, applications 445, etc.) Further, connection to other computing devices such as network input/output devices may be employed.

Some embodiments may employ a computer system (such as the computer system 400) to perform methods in accordance with the disclosure. For example, some or all of the procedures of the described methods may be performed by the computer system 400 in response to processing unit 410 executing one or more sequences of one or more instructions (which might be incorporated into the operating system 440 and/or other code, such as an application program 445) contained in the working memory 435. Such instructions may be read into the working memory 435 from another computer-readable medium, such as one or more of the storage device(s) 425. Merely by way of example, execution of the sequences of instructions contained in the working memory 435 might cause the processing unit 410 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 400, various computer-readable media might be involved in providing instructions/code to processing unit 410 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 425. Volatile media include, without limitation, dynamic memory, such as the working memory 435. Transmission media include, without limitation, coaxial cables, copper wire and fiber optics, including the wires that comprise the bus 405, as well as the various components of the communication interface 430 (and/or the media by which the communication interface 430 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a magnetic medium, optical medium, or any other physical medium with patterns of holes, a RAM, a PROM, EPROM, a FLASH-EPROM, any other memory chip or cartridge, a carrier wave as described hereinafter, or any other medium from which a computer can read instructions and/or code.

The communication interface 430 (and/or components thereof) generally will receive the signals, and the bus 405 then might carry the signals (and/or the data, instructions, etc. carried by the signals) to the working memory 435, from which the processor(s) 405 retrieves and executes the instructions. The instructions received by the working memory 435 may optionally be stored on a non-transitory storage device 425 either before or after execution by the processing unit 410.

The methods, systems, and devices discussed above are examples. Some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

What is claimed is:

1. A method for converting a barcode media into a magnetic stripe media, the method comprising:
    reading data encoded on a barcode media using a barcode reader, wherein the data comprises information indicative of a transit purchase and an identifier of the barcode media;
    authenticating the barcode media by checking the identifier of the barcode media against a list of issued barcodes;
    determining that the barcode media is unused by checking the identifier of the barcode media against a list of used or unused barcode media;
    converting the data from the barcode media into magnetic data storable on a magnetic media;
    writing the magnetic data onto the magnetic media;
    distributing the magnetic media containing the magnetic data; and
    communicating information related to a conversion transaction, wherein the information related to the conversion transaction comprises an indication of the distribution of the magnetic media.

2. The method for converting a barcode media into a magnetic stripe media of claim 1, further comprising:
    checking a status of a component of a barcode to magnetic media converter;
    determining an available stock of magnetic media remaining in the barcode to magnetic media converter; and
    transmitting the status and a number representing the available stock to a device monitoring system.

3. The method for converting a barcode media into a magnetic stripe media of claim 1, wherein the information indicative of the transit purchase comprises:
    a time of the transit purchase, a date of the transit purchase, or the location of the transit purchase.

4. The method for converting a barcode media into a magnetic stripe media of claim 1, wherein:
    the list of issued barcodes and the list of used or unused barcodes are on a local barcode media system or on a central barcode media system.

5. The method for converting a barcode media into a magnetic stripe media of claim 1, further comprising:
    presenting information related to a conversion of the barcode media on a display.

6. The method for converting a barcode media into a magnetic stripe media of claim 1, further comprising:
    communicating an indication that the barcode media has been used.

7. The method for converting a barcode media into a magnetic stripe media of claim 1, further comprising:
    associating funds used as payment for the barcode media with the magnetic media.

8. A non-transitory computer-readable medium having instructions embedded thereon for converting a barcode media into a magnetic stripe media, the instructions comprising computer code for causing a computing device to:
    read data encoded on a barcode media, wherein the data comprises information indicative of a transit purchase and an identifier of the barcode media;
    authenticate the barcode media by checking the identifier of the barcode media against a list of issued barcodes;
    determine that the barcode media is unused by checking the identifier of the barcode media against a list of used or unused barcode media;
    convert the data from the barcode media into magnetic data storable on a magnetic media;
    write the magnetic data onto the magnetic media;
    distribute the magnetic media containing the magnetic data; and
    communicate information related to a conversion transaction, wherein the information related to the conversion transaction comprises an indication of the distribution of the magnetic media.

9. The non-transitory computer-readable medium as recited in claim 8, further comprising instructions for causing the computing device to:
    check a status of a component of a barcode to magnetic media converter;
    determine an available stock of magnetic media remaining in the barcode to magnetic media converter; and
    transmit the status and a number representing the available stock to a device monitoring system.

10. The non-transitory computer-readable medium as recited in claim 8, wherein the information indicative of the transit purchase comprises:
    a time of the transit purchase, a date of the transit purchase, or a location of the transit purchase.

11. The non-transitory computer-readable medium as recited in claim 8, wherein:
    the list of issued barcodes and the list of used or unused barcodes are on a local barcode media system or on a central barcode media system.

12. The non-transitory computer-readable medium as recited in claim 8, further comprising instructions for causing the computing device to:
    present information related to a conversion of the barcode media on a display.

13. The non-transitory computer-readable medium as recited in claim 8, further comprising instructions for causing the computing device to:
    communicate an indication that the barcode media has been used.

14. The non-transitory computer-readable medium as recited in claim 8, further comprising instructions for causing the computing device to:
    associate funds used as payment for the barcode media with the magnetic media.

15. A system for converting a barcode media into a magnetic stripe media, the system comprising:
- a barcode reader configured to read data encoded on a barcode media, wherein the data comprises information indicative of a transit purchase and an identifier of the barcode media;
- a writing module configured to write magnetic data to a magnetic media;
- a distribution module configured to distribute the magnetic media; and
- a processor configured to:
  - authenticate the barcode media by checking the identifier of the barcode media against a list of issued barcodes;
  - determine that the barcode media is unused by checking the identifier of the barcode media against a list of used or unused barcode media;
  - convert the data from the barcode media into magnetic data storable on a magnetic media;
  - cause the writing module to write the magnetic data onto the magnetic media;
  - cause the distribution module to distribute the magnetic media; and
  - communicate information related to a conversion transaction, wherein the information related to the conversion transaction comprises an indication of the distribution of the magnetic media.

16. The system for converting a barcode media into a magnetic stripe media of claim 15, further comprising:
- a display configured to present information related to a conversion of the barcode media.

17. The system for converting a barcode media into a magnetic stripe media of claim 15, wherein the processor is further configured to:
- check a status of a component of a barcode to magnetic media converter;
- determine an available stock of magnetic media remaining in the barcode to magnetic media converter; and
- transmit the status and a number representing the available stock to a device monitoring system.

18. The system for converting a barcode media into a magnetic stripe media of claim 15, wherein the information indicative of the transit purchase comprises:
- a time of the transit purchase, a date of the transit purchase, or a location of the transit purchase.

19. The system for converting a barcode media into a magnetic stripe media of claim 15, wherein the processor is further configured to:
- communicate an indication that the barcode media has been used.

20. The system for converting a barcode media into a magnetic stripe media of claim 15, wherein the processor is further configured to:
- associate funds used as payment for the barcode media with the magnetic media.

* * * * *